United States Patent
Yonke et al.

(10) Patent No.: US 9,652,763 B2
(45) Date of Patent: May 16, 2017

(54) DONATION DEVICE AND METHOD

(71) Applicant: Pod Giving LLC, Fishers, IN (US)

(72) Inventors: Michael Stephens Yonke, Carmel, IN (US); Benjamin Thomas Royal, Fishers, IN (US)

(73) Assignee: Pod Giving LLC, Fishers, IN (US)

( * ) Notice: Subject to any disclaimer, the term of this patent is extended or adjusted under 35 U.S.C. 154(b) by 0 days.

(21) Appl. No.: 14/871,786

(22) Filed: Sep. 30, 2015

(65) Prior Publication Data

US 2016/0098704 A1 Apr. 7, 2016

Related U.S. Application Data

(60) Provisional application No. 62/058,924, filed on Oct. 2, 2014.

(51) Int. Cl.
*G06Q 20/34* (2012.01)
*G06Q 20/30* (2012.01)
*G07F 7/08* (2006.01)

(52) U.S. Cl.
CPC .......... *G06Q 20/34* (2013.01); *G06Q 20/30* (2013.01); *G07F 7/0873* (2013.01)

(58) Field of Classification Search
CPC ...... G06Q 20/04; G06Q 20/363; G06Q 20/34; G06Q 20/30; G07C 2011/02; G07C 9/00111; G07F 7/0866; G07F 7/0873
See application file for complete search history.

(56) References Cited

U.S. PATENT DOCUMENTS

| | | | |
|---|---|---|---|
| 5,055,660 A | 10/1991 | Bertagna et al. | |
| 5,294,782 A | 3/1994 | Kumar | |
| 5,663,547 A | 9/1997 | Ziarno | |
| 5,887,273 A * | 3/1999 | Ziarno | G07F 5/22 705/35 |
| 5,909,794 A | 6/1999 | Molbak et al. | |
| 6,253,998 B1 | 7/2001 | Ziarno | |
| 7,789,542 B2 * | 9/2010 | Lederer | A47G 33/00 362/161 |
| 8,086,531 B2 | 12/2011 | Litster et al. | |
| 8,540,147 B2 | 9/2013 | Block et al. | |
| 8,762,265 B2 | 6/2014 | Kessler et al. | |
| 9,111,266 B2 | 8/2015 | Kessler et al. | |
| 9,437,085 B1 * | 9/2016 | Rempe et al. | G07G 1/0027 |
| 2009/0039150 A1 | 2/2009 | Lay | |
| 2013/0273843 A1 | 10/2013 | Shimota et al. | |
| 2014/0025599 A1 | 1/2014 | Killoran | |
| 2014/0149287 A1 | 5/2014 | Mafolasire | |
| 2015/0242663 A1 | 8/2015 | Babu et al. | |
| 2015/0317616 A1 | 11/2015 | Kessler et al. | |

FOREIGN PATENT DOCUMENTS

JP 2002259880 9/2002

\* cited by examiner

*Primary Examiner* — Sonji Johnson
(74) *Attorney, Agent, or Firm* — Faegre Baker Daniels LLP

(57) ABSTRACT

An electronic, hand-held, and portable donation device and method are disclosed for collecting financial donations. The donation device may include a plurality of electronic payment processors, each payment processor corresponding to a different monetary amount.

20 Claims, 6 Drawing Sheets

Organization Name: ABC Parish
Date: February 8, 2015

| Last Name | First Name | Card Issuer | Card Number | Individual Amount | Total Amount |
|---|---|---|---|---|---|
| Smith | Joe | VISA | **** **** **** 1234 | $ 50.00 | $ 50.00 |
| Miller | Amy | Chase Bank | **** **** **** 5678 | $ 10.00 | $ 35.00 |
| Miller | Amy | Chase Bank | **** **** **** 5678 | $ 25.00 | |
| . . . | | | | | |
| . . . | | | | | |

DONATION DEVICE AND METHOD

CROSS REFERENCE TO RELATED APPLICATION

This application claims priority to U.S. Provisional Patent Application Ser. No. 62/058,924, filed Oct. 2, 2014, the disclosure of which is hereby expressly incorporated by reference herein in its entirety.

FIELD OF THE DISCLOSURE

The present disclosure relates to a donation device. More particularly, the present disclosure relates to an electronic donation device, and to a method for using the same to collect donations.

BACKGROUND OF THE DISCLOSURE

Organizations often solicit donations from donors. In some situations, a donor is asked to make a pledge of future payment to the organization. However, a problem with such requests is that the donor may forget about the pledge or not honor the pledge. In other situations, the donor is asked to make an immediate payment to the organization. However, a problem with such requests is that the donor may not have his or her check book or adequate cash on hand to make a desired donation. In both of these situations, the organization may lose potential donations.

SUMMARY

The present disclosure provides an electronic, hand-held, and portable donation device and method for collecting financial donations.

According to an exemplary embodiment of the present disclosure, a donation device is provided for use with a donor's payment source. The device includes a portable body and a plurality of electronic payment processors coupled to the body and configured to communicate with the payment source, each payment processor corresponding to a different monetary amount.

According to another exemplary embodiment of the present disclosure, a donation device is disclosed for use with a donor's payment source. The device includes a portable body, a first electronic payment processor coupled to the body, a second electronic payment processor coupled to the body, and a controller configured to associate the payment source with a first monetary amount when the payment source communicates with the first payment processor, and a second monetary amount when the payment source communicates with the second payment processor, the second monetary amount exceeding the first monetary amount.

According to yet another exemplary embodiment of the present disclosure, a method is disclosed for receiving a donation from a donor having a payment source. The method includes providing a portable donation device to the donor, the device including at least a first electronic payment processor and a second electronic payment processor, and receiving the donation from the donor, the donation having a first monetary amount when the payment source communicates with the first payment processor and a second monetary amount when the payment source communicates with the second payment processor.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 7 is a donation record associated with the donation device of FIG. 1.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

FIGS. 1-6 provide an electronic device 100 that is used to collect financial donations. In certain embodiments, device 100 may receive, store, and process financial donations. Device 100 may be hand-held and portable, enabling device 100 to be passed from one donor to another.

Figure 1:
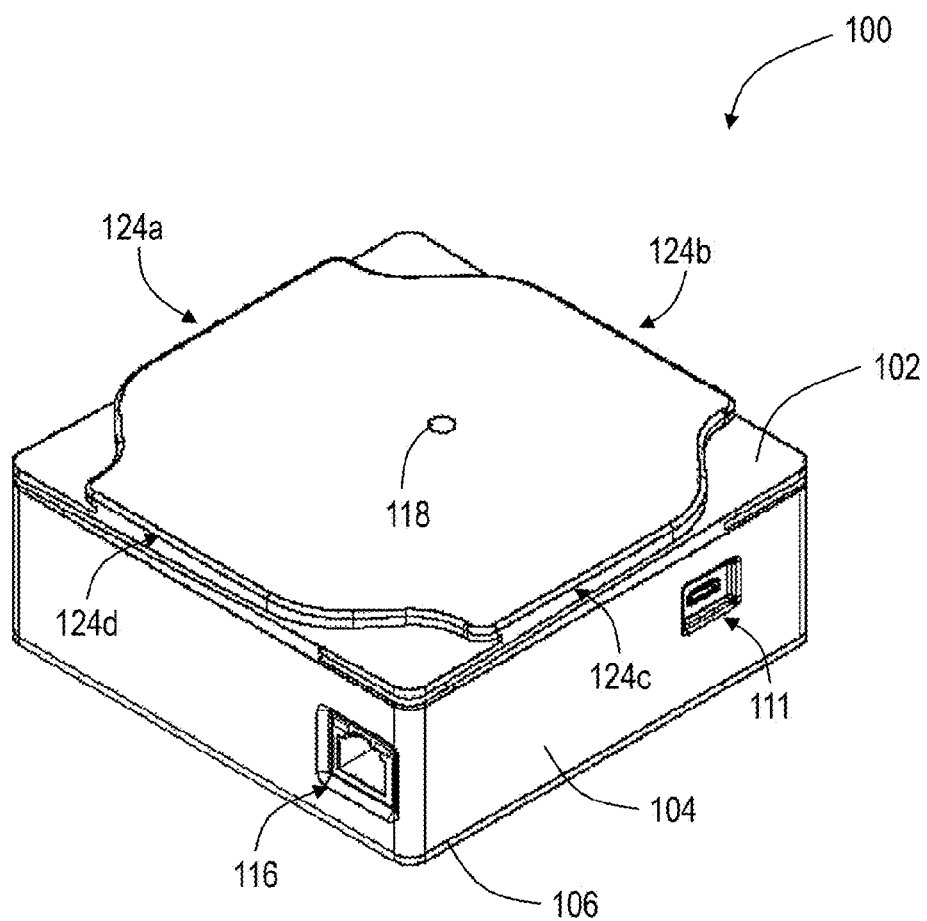
FIG. 1 is an assembled perspective view of an exemplary donation device of the present disclosure.
Figure 2:
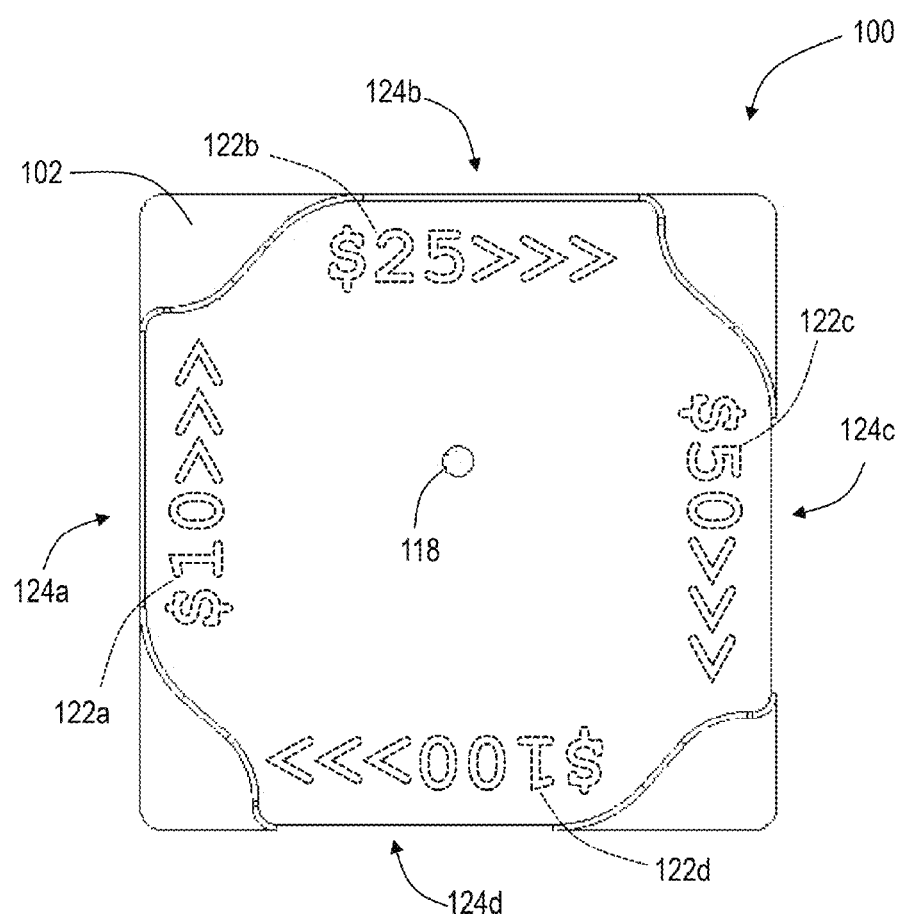
FIG. 2 is a top plan view of the donation device of FIG. 1.
Figure 3:
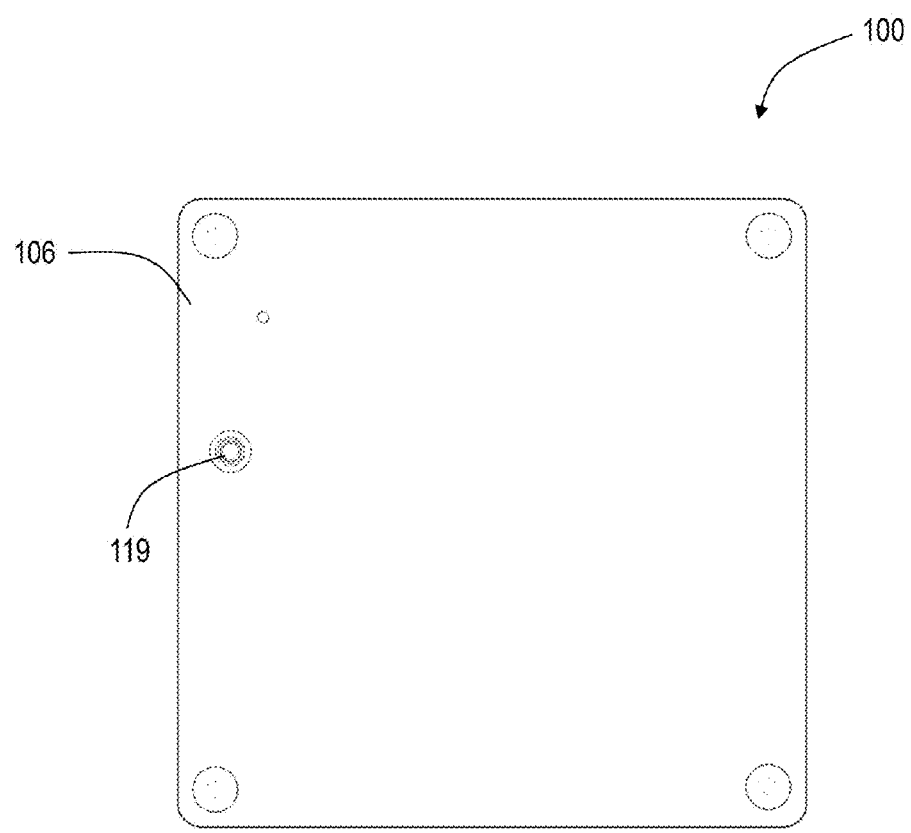
FIG. 3 is a bottom plan view of the donation device of FIG. 1.
Figure 4:
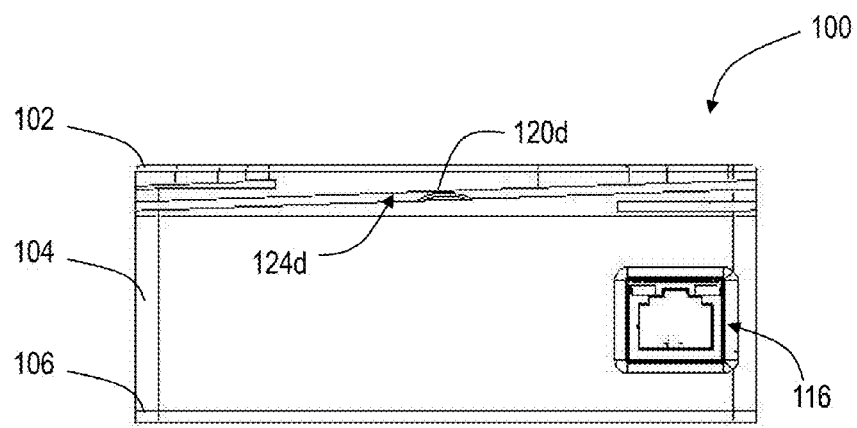
FIG. 4 is a side elevational view of the donation device of FIG. 1.
Figure 5:
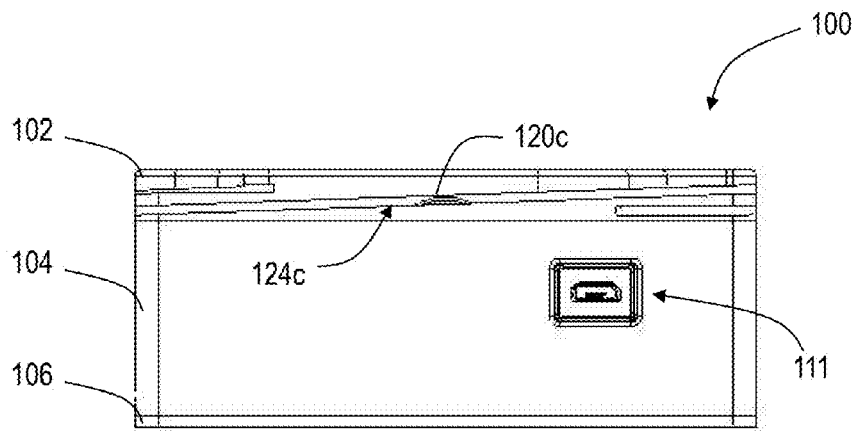
FIG. 5 is another side elevational view of the donation device of FIG. 1.

As shown in FIGS. 2 and 3, the illustrative device 100 has 4 sides and is square-shaped. The width and length of device 100 may be about 3 inches, 4 inches, 5 inches, 6 inches, or more to comfortably fit in a donor's hand. However, the size and shape of device 100 may vary. For example, rather than having 4 sides, device 100 may have 3 sides, 5 sides, 6 sides, or more.

Figure 6:
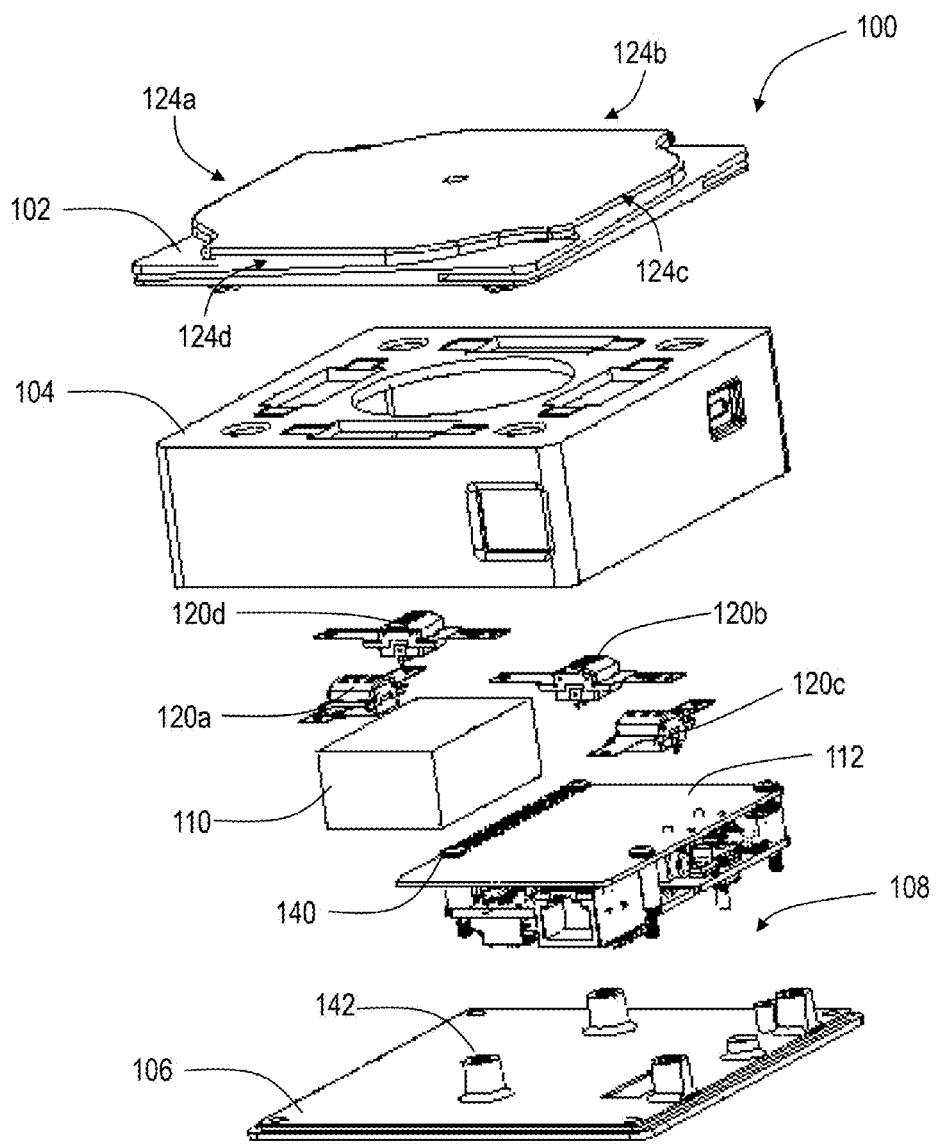
FIG. 6 is an exploded perspective view of the donation device of FIG. 1.

As shown in FIG. 6, the illustrative device 100 includes a lid 102, a body 104, and a base 106. Body 104 and base 106 of device 100 cooperate to define an enclosed interior compartment 108.

The interior compartment 108 of device 100 includes an internal power source 110, illustratively a battery, and a charging port 111, illustratively a standard or micro Universal Serial Bus (USB) port. The charging port 111 may be accessible through lid 104 for connecting the internal power source 110 to an external power source (not shown) and recharging the internal power source 110. However, it is also within the scope of the present disclosure to replace the internal power source 110 rather than recharging the internal power source 110.

The interior compartment 108 of device 100 also includes an electronic controller 112, illustratively a printed circuit board (PCB) assembly. Controller 112 may be mounted to base 106 by inserting fasteners 140 (e.g., screws) through controller 112 and into threaded posts 142 on base 106. Controller 112 may include a memory (not shown), illustratively a secure digital (SD) non-volatile memory card, and a communication port 116, illustratively an Ethernet port. The communication port 116 may be accessible through lid 104 for connecting controller 112 to one or more external recipients (not shown) and transferring data to the external recipients. It is also within the scope of the present disclosure that the communication port 116 may be configured to communicate wirelessly with the external recipients, such as via a cellular wide area network (WAN) or a Wi-Fi local area network (LAN).

Returning to FIG. 2, the illustrative device 100 also includes an indicator light 118 that is visible through lid 102. The indicator light 118 may communicate information from the controller 112 to the user, as discussed further below.

Returning to FIG. 3, the illustrative device 100 further includes a power switch 119 that is accessible through base 106. When pressed by the user, the power switch 119 may selectively power device 100 on and off.

Returning to FIG. 6, the illustrative device 100 still further includes a plurality of electronic payment processors 120. In the illustrated embodiment of FIG. 6, device 100 includes 4 payment processors 120a-120d arranged in a square pattern around body 104 of device 100, but the number and arrangement of payment processors 120 may vary. For example, device 100 may include 2, 3, 5, 6, or more payment processors 120 arranged in different patterns.

Each payment processor 120 may be configured to read or otherwise communicate with a donor's payment source. Device 100 may use a variety of different payment processors 120 to accommodate various forms of payment. One exemplary payment processor 120 is a card reader, such as a magnetic stripe card reader (MSR), capable of reading a donor's payment card, such as a credit card (e.g., VISA, MasterCard, Discover), a debit card, or a pre-paid card. Another suitable payment processor 120 is a contact or contactless smart card reader capable of reading a donor's smart payment card (e.g., EMV smart card). Other suitable payment processors 120 include radio-frequency identification (RFID) readers and near-field communication (NFC) readers capable of reading tags in a donor's smart phone or another mobile device (e.g., Apple Pay).

Each payment processor 120a-120d may be associated with a predetermined monetary amount. This monetary amount may be printed or otherwise displayed on device 100, such as on lid 102 of device 100. In FIG. 2, for example, label 122a (shown in phantom) associates payment processor 120a with a monetary amount of $10, label 122b (shown in phantom) associates payment processor 120b with a monetary amount of $25, label 122c (shown in phantom) associates payment processor 120c with a monetary amount of $50, and label 122d (shown in phantom) associates payment processor 120d with a monetary amount of $100. These monetary amounts may vary depending on the particular organization, its fundraising schedule, and its fundraising needs. For example, an organization that uses device 100 weekly may associate payment processors 120a-120d with relatively small monetary amounts, while an organization that uses device 100 annually may associate payment processors 120a-120d with relatively large monetary amounts.

By providing different payment processors 120a-120d associated with different monetary amounts, device 100 may lack additional user inputs. Such user inputs may increase the time required to use device 100 and may lead to user error, for example. Therefore, the lack of such user inputs may allow device 100 to be used quickly and easily during a fundraising event. However, in certain embodiments, device 100 may also include a user input (e.g., a key pad) to associate a payment processor with a custom, user-specified monetary amount.

In embodiments where payment processors 120a-120d are card readers, lid 102 and body 104 may communicate to define exposed slots 124a-124d for swiping the donor's payment card across the corresponding payment processor 120a-120d. In the illustrated embodiment of FIG. 2, device 100 includes 4 exposed slots 124a-124d arranged horizontally in a square pattern around the perimeter of device 100, but the number and arrangement of slots 124a-124d may vary depending on the number and arrangement of payment processors 120a-120d. Each label 122a-122d may display the monetary amount associated with the corresponding payment processor 120a-120d, as discussed above, as well as arrows or other symbols indicating the proper direction of travel for the donor's payment card through the corresponding slot 124a-124d. In the illustrated embodiments of FIGS. 4 and 5, each payment processor 120a-120d protrudes through body 104 and into the corresponding slot 124a-124d to read the donor's payment card.

During the fundraising event, device 100 may be passed from donor to donor. When device 100 is being used in a church, for example, device 100 may be passed around by hand or inside of a traditional collection basket. Each donor may use one or more payment processors 120a-120d corresponding to his or her desired donation. For example, the donor may swipe his or her credit card through slot 124a and across payment processor 120a to donate $10, through slot 124b and across payment processor 120b to donate $25, through slot 124c and across payment processor 120c to donate $50, or through slot 124d and across payment processor 120d to donate $100. The donor may also swipe his or her card across multiple payment processors 120a-120d in combination. For example, the donor may swipe his or her credit card across payment processor 120a to donate $10 and across payment processor 120b to donate $25, for a total combined donation of $35. In embodiments in which device 100 includes a user input (e.g., a key pad), the donor may enter his or her desired donation amount and then swipe his or her credit card across a corresponding payment processor to donate the specified amount.

Controller 112 may receive the donor's payment information (e.g., name, card issuer, card number) and the donation amount from the activated payment processor 120a-120d and store that information in the memory. The ability to store the donations in the memory during the fundraising event may avoid any external communication delays during the fundraising event. However, it is also within the scope of the present disclosure to transmit the donations wirelessly and in real-time to the external recipient, as discussed further below. Controller 112 may also activate indicator light 118 to confirm a successful transaction before the donor passes device 100 to the next donor.

After the fundraising event, communication port 116 of device 100 may send the stored donations from the memory to one or more external recipients for further processing. For example, communication port 116 of device 100 may send the stored donations to the organization's computer to link the donations with existing account information in the organization's donation database. Also, communication port 116 of device 100 may send the stored donations to the parties responsible for payment of the donations, which may include financial institutions (e.g., credit card providers, banks) or third-party acquirers, to request payment of the donations. In embodiments where communication port 116 is an Ethernet port, the communication between device 100 and the external recipients may occur, at least in part, via an Ethernet cable. While sending the stored donations from device 100, charging port 111 of device 100 may also be plugged into the external power source to recharge the internal power source 110.

Rather than waiting until after the fundraising event to send the stored donations to the external recipients, it is also within the scope of the present disclosure for communication port 116 to transmit the donations wirelessly and in real-time to the external recipients. In these embodiments, the communication between device 100 and the external recipients may occur via a WAN or a LAN, for example.

Referring next to FIG. 7, a donation record 200 associated with device 100 is shown. Donation record 200 may be generated directly by controller 112 and/or by an external recipient of data from controller 112. The illustrative donation record 200 includes the organization's name, the date, and for each individual donation on device 100, the donor's name, card issuer, card number, and amount.

According to an exemplary embodiment of the present disclosure, donation record 200 may automatically combine donations associated with the same donor. In FIG. 7, for example, donor Amy Miller swiped her card across the payment processor associated with a $10 donation and the payment processor associated with a $25 donation, for a total combined donation of $35 in donation record 200. Rather than sending each individual donation to Amy's card issuer and incurring multiple processing fees, the combined donation may be sent to Amy's card issuer to incur only a single processing fee.

Current and historical donation records 200 may be stored in a database for controlled access and analysis. For example, a leader of the organization (e.g., a church pastor) may enter a password into the database to see all donations to the organization and to generate reports. As another example, an individual donor (e.g., a church parishioner) may enter his or her name and card information into the database to see his or her own donations to the organization and to generate receipts.

Device 100 may be used in combination with other donation systems for added convenience. For example, device 100 may be used in combination with online donation systems, stationary donation kiosks, and cash or check collection systems.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A donation device for use with a donor's payment source, the device comprising:
   a portable body; and
   a plurality of electronic payment processors coupled to the body and configured to communicate with the same payment source, each payment processor corresponding to a different monetary amount.

2. The donation device of claim 1, wherein the payment processors comprise card readers and the payment source comprises a payment card.

3. The donation device of claim 1, wherein the payment processors comprise at least one of magnetic stripe card readers, smart card readers, radio-frequency identification readers, and near-field communication readers.

4. The donation device of claim 1, further comprising a plurality of slots in the body, wherein each slot is associated with one of the payment processors and is sized to receive the payment source.

5. The donation device of claim 1, further comprising a plurality of labels on the body, wherein each label is associated with one of the payment processors and identifies the monetary amount corresponding to the payment processor.

6. The donation device of claim 1, further comprising a controller configured to process data from the payment processors.

7. The donation device of claim 6, wherein the controller includes a memory configured to store data from the payment processors.

8. The donation device of claim 6, wherein the controller includes a communication port configured to send data from the payment processors to an external recipient.

9. The donation device of claim 1, further comprising a power source in communication with the payment processors.

10. The donation device of claim 1, wherein the payment processors are arranged about an outer perimeter of the body.

11. A donation device for use with a donor's payment source, the device comprising:
    a portable body;
    a first electronic payment processor coupled to the body;
    a second electronic payment processor coupled to the body; and
    a controller configured to associate the payment source with:
      a first monetary amount when the payment source communicates with the first payment processor, and
      a second monetary amount when the same payment source communicates with the second payment processor, the second monetary amount exceeding the first monetary amount.

12. The donation device of claim 11, wherein the controller is configured to associate the payment source with a combined monetary amount equal to the sum of the first and second monetary amounts when the payment source communicates with the first and second payment processors.

13. The donation device of claim 11, further comprising an indicator light coupled to the body, wherein the controller activates the indicator light after associating the payment source with the corresponding monetary amount.

14. A donation device for use with a donor's payment source, the device comprising:
    a portable body;
    a first electronic payment processor coupled to the body;
    a second electronic payment processor coupled to the body;
    a third electronic payment processor coupled to the body; and
    a fourth electronic payment processor coupled to the body; and
    a controller configured to associate the payment source with:
      a first monetary amount when the payment source communicates with the first payment processor,
      a second monetary amount when the payment source communicates with the second payment processor, the second monetary amount exceeding the first monetary amount,
      a third monetary amount when the payment source communicates with the third payment processor, and
      a fourth monetary amount when the payment source communicates with the fourth payment processor, the fourth monetary amount exceeding the first, second, and third monetary amounts.

15. The donation device of claim 14, wherein:
the first payment processor is arranged on a first side of the body;
the second payment processor is arranged on a second side of the body;
the third payment processor is arranged on a third side of the body; and
the fourth payment processor is arranged on a fourth side of the body.

16. A method of receiving a donation from a donor having a payment source, the method comprising:
providing a portable donation device to the donor, the device including at least a first electronic payment processor and a second electronic payment processor; and
receiving the donation from the donor, the donation having a first monetary amount when the payment source communicates with the first payment processor and a second monetary amount when the same payment source communicates with the second payment processor.

17. The method of claim 16, wherein the donation has a combined monetary amount equal to the sum of the first and second monetary amounts when the payment source communicates with the first and second payment processors.

18. The method of claim 16, further comprising:
providing the device to a second donor; and
receiving a second donation from the second donor.

19. The method of claim 18, further comprising creating a donation record including the donation from the donor and the second donation from the second donor.

20. The method of claim 16, further comprising requesting payment of the donation from a third-party responsible for payment on the payment source.

* * * * *